(12) United States Patent
Mochizuki et al.

(10) Patent No.: US 8,711,387 B2
(45) Date of Patent: Apr. 29, 2014

(54) NON-TRANSITORY COMPUTER READABLE RECORDING MEDIUM STORING PRINT MANAGEMENT PROGRAM, PRINT MANAGEMENT DEVICE, PRINT MANAGEMENT METHOD, AND PRINT SYSTEM

(75) Inventors: Toshihiro Mochizuki, Tokyo (JP); Hiroyuki Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 137 days.

(21) Appl. No.: 13/406,696

(22) Filed: Feb. 28, 2012

(65) Prior Publication Data
US 2012/0224221 A1   Sep. 6, 2012

(30) Foreign Application Priority Data
Mar. 2, 2011   (JP) ................. 2011-045641

(51) Int. Cl.
*G06F 3/12*   (2006.01)
*G06K 15/00*   (2006.01)

(52) U.S. Cl.
USPC ........ 358/1.14; 358/1.12; 358/1.13; 358/1.15

(58) Field of Classification Search
USPC .................................................. 358/1.1–1.9
See application file for complete search history.

(56) References Cited

U.S. PATENT DOCUMENTS

| 6,940,615 B1 * | 9/2005 | Shima .................... 358/1.15 |
| 2008/0079993 A1 * | 4/2008 | Kanamoto ............. 358/1.15 |
| 2010/0118337 A1 | 5/2010 | Kiuchi | |

FOREIGN PATENT DOCUMENTS

| JP | 2007-241877 A | 9/2007 |
| JP | 2010-111100 A | 5/2010 |

OTHER PUBLICATIONS

English language abstract for US-20100118337 corresponds to JP-2010-111100-A.

* cited by examiner

*Primary Examiner* — King Poon
*Assistant Examiner* — Ibrahim Siddo
(74) *Attorney, Agent, or Firm* — Harness, Dickey & Pierce, P.L.C.

(57) ABSTRACT

A non-transitory computer readable recording medium that stores a print management program causing a computer to function as a retrieval unit that retrieves information about first functions of an image forming device and information about second functions of plural second devices; and a determination unit that determines whether the second functions of the second devices can process a print job, when the first functions of the image forming device cannot process the print job. Here, the image forming device and the second devices are connected to a print system including the computer. When the determination unit determines that the second functions of the second devices cannot process the print job, the print management program constrains the second functions of the second devices from being utilized.

8 Claims, 9 Drawing Sheets

| DEVICE NAME | COLOR PRINTING FUNCTION | MONOCHROME PRINTING FUNCTION | STAPLING FUNCTION | HOLE-PUNCHING FUNCTION |
|---|---|---|---|---|
| COLOR PRINTER | ON | ON | ON | ON |
| STAPLER | OFF | OFF | ON | OFF |
| HOLE-PUNCH DEVICE | OFF | OFF | OFF | ON |

| FIRST DEVICE NAME | FIRST FUNCTION NAME | FIRST FUNCTIONAL VALUE | SECOND DEVICE NAME | SECOND FUNCTION NAME | SECOND FUNCTIONAL VALUE |
|---|---|---|---|---|---|
| COLOR PRINTER | COLOR PRINTING FUNCTION | ON | COLOR PRINTER | MONOCHROME PRINTING FUNCTION | ON |
| COLOR PRINTER | COLOR PRINTING FUNCTION | OFF | COLOR PRINTER | MONOCHROME PRINTING FUNCTION | OFF |
| COLOR PRINTER | STAPLING FUNCTION | ON | COLOR PRINTER | HOLE-PUNCHING FUNCTION | ON |

| FIRST DEVICE NAME | FIRST FUNCTION NAME | FIRST FUNCTIONAL VALUE | SECOND DEVICE NAME | SECOND FUNCTION NAME | SECOND FUNCTIONAL VALUE |
|---|---|---|---|---|---|
| COLOR PRINTER | STAPLING FUNCTION | ON | STAPLER | STAPLING FUNCTION | ON |
| COLOR PRINTER | HOLE-PUNCHING FUNCTION | ON | HOLE-PUNCH DEVICE | HOLE-PUNCHING FUNCTION | ON |

FIG.8

| FIRST DEVICE NAME | FIRST FUNCTION NAME | FIRST FUNCTIONAL VALUE | SECOND DEVICE NAME | SECOND FUNCTION NAME | SECOND FUNCTIONAL VALUE |
|---|---|---|---|---|---|
| COLOR PRINTER | HOLE-PUNCHING FUNCTION | ON | STAPLER | STAPLING FUNCTION | ON |
| HOLE-PUNCH DEVICE | HOLE-PUNCHING FUNCTION | ON | STAPLER | STAPLING FUNCTION | ON |
| STAPLER | STAPLING FUNCTION | ON | COLOR PRINTER | * | * |
| HOLE-PUNCH DEVICE | HOLE-PUNCHING FUNCTION | ON | COLOR PRINTER | * | * |

NON-TRANSITORY COMPUTER READABLE RECORDING MEDIUM STORING PRINT MANAGEMENT PROGRAM, PRINT MANAGEMENT DEVICE, PRINT MANAGEMENT METHOD, AND PRINT SYSTEM

BACKGROUND OF THE INVENTION

1. Field of the Invention

An embodiment of the present invention relates to a print management program, a print management device, a print management method, and a print system for managing print jobs.

2. Description of the Related Art

In a commercial printing industry, a commercial print service provider receives a printed material (such as a catalog, or an advertisement) from a customer, the commercial print service provider produces a customer's desired printed output material from the printing material, and the commercial print service provider receives compensation in return for delivering the printed output material to the customer. The commercial print service provider produces the printed output material by performing plural processes including the reception of the printing material and the delivery of the printed output material. The processes from the reception of the printing material to the delivery of the printed output material include prepress processes, such as the reception of the printing material from the customer, a reception of printing conditions for a printed output material, a color correction, a layout modification, and a correction of a binding position; post-press processes, such as proof printing for the customer to confirm the result of the prepress processes, printing and subsequent binding, and pressure bonding; and the delivery of the printed output material to the customer. Here, the number of the processes between the reception of the printing material and the delivery of the printed output material varies depending on a customer's desired printing condition for the printed output material.

In a conventional commercial printing industry, a commercial print service provider tends to receive an order for printed materials that require mass printing from a customer, and the commercial print service provider responds to the mass printing of the printed materials by the above described processes. Further, for the printed materials that require the mass printing, there are many cases in which a printing condition on the printed materials from a customer is fixed. In the conventional commercial printing industry, the commercial print service provider performs the mass printing under a determined single printing condition. After completing the lot printing, the printing condition is altered, and the mass printing under the altered printing condition is performed again. Through such a print cycle, the customer's desired printed output material is produced.

In the above printing cycle, plural processes tend to occur, when the printing condition is altered. Therefore, when the printing condition is not altered, the commercial print service provider can perform continuous printing in an ongoing process. Thus the mass printing can be efficiently performed.

Recently, in the commercial printing industry, a so-called "print-on-demand (POD) market" is emerging, where relatively small lots of printed materials are delivered to a customer in a short delivery time. In the POD market, orders from plural customers tend to occur. Consequently, in the POD market, printed materials submitted to a commercial print service provider and printing conditions on printed output materials are diversified.

Further, recently, digital printing has been widely used, and a computer has been widely used for controlling processes for producing printed materials. For example, technologies are emerging, such as a workflow for submitting a printed material as electronic data through a network and for controlling the above described plural processes. For example, in the workflow, printing operations in the plural processes are defined using a job ticket, which is called "Job Definition Format (JDF)," and the printing operations are controlled by a printing system.

In accordance with such a change in the printing environment, commercial print service providers have been introducing the computer technologies into the printing systems, so as to produce printed materials, in response to receiving orders for the printed materials. On the other hand, the commercial service providers have been required to set up printing systems that can handle diversified printing conditions for the printed materials from customers. Further, in order to produce diversified printed materials desired by the customers, the commercial print service providers have been required to respond in a system aspect, such as introduction of plural printer devices and peripheral devices, as well as in a process aspect, such as modification of the above described plural processes in a relatively short cycle.

The commercial print service providers have been required to respond as described above. Additionally, the commercial print service providers may be required to improve operational efficiency so as to increase profit. Measures for improving the operational efficiency include simplification of the processes.

In the production print (PP) business, as a prepress process, an imposition process and a print setting process are performed by using plural applications and digital front ends (DFE). In the print setting process, finisher processing includes more setting items, such as settings of stapling and hole-punching, as well as various settings of folding and cutting, compared to setting items of a multi-function peripheral (MFP). In a prepress process, a print preview image may be altered or use of an unavailable function may be constrained, depending on a capability of a post-processing (finishing) device.

Conventionally, as a technique for improving usability of the device, the following technique has been known. Namely, under a condition in which a specification of a job ticket that can be processed by a printing system may vary, a determination is made as to whether the job ticket transmitted to a device can be processed by a printing device (e.g., Patent Document 1 (Japanese Published Unexamined Application No. 2010-111100)).

In the PP business, not only a finisher, which can perform hole-punching and stapling, is connected to a printing device, but also various devices, such as a stand-alone device that can perform hole-punching and stapling, a stand-alone folding device, and a stand-alone cutting device, are combined to produce a single printed output material.

Therefore, when available functions are restricted only based on a capability of the printing device, even though the printing system includes the stand-alone device that can perform hole-punching and stapling, a print job of a printed output material, which may be output by using the whole printing system, may not be produced. Further, even if there are some functions that may not be performed simultaneously in the printing device by itself because of constraining settings, the functions may be performed in the whole printing system by utilizing the stand-alone devices that can perform hole-punching and stapling. However, in this case, the printing system may not notify an operator of the availability of the functions.

An embodiment of the present invention is developed in view of the above problems. An objective of the embodiment is to provide a print management program, a print management device, a print management method, and a print system that can perform print setting, in which the entire printing processes are reflected.

SUMMARY OF THE INVENTION

In one aspect, there is provided a non-transitory computer readable recording medium that stores a print management program causing a computer to function as a retrieval unit that retrieves information about first functions of an image forming device and information about second functions of plural second devices, wherein the image forming device and plural of the second devices are connected to a print system including the computer; and a determination unit that determines whether the second functions of the second devices can process a print job, when the first functions of the image forming device cannot process the print job. When the determination unit determines that the second functions of the second devices cannot process the print job, the print management program constrains the second functions of the second devices from being utilized.

In another aspect, there is provided a print management device including a retrieval unit that retrieves information about first functions of an image forming device and information about second functions of plural second devices, wherein the image forming device and the second devices are connected to a print system including the print management device; and a determination unit that determines whether the second functions of the second devices can process a print job, when the first functions of the image forming device cannot process the print job. When the determination unit determines that the second functions of the second devices cannot process the print job, the print management device constrains the second functions from being utilized.

In another aspect, there is provided a print management method executed by a computer. The method includes a retrieval step of retrieving information about first functions of an image forming device and information about second functions of plural second devices, wherein the image forming device and plural of the second devices are connected to a print system including the computer; and a determination step of determining whether the second functions of the second devices can process a print job, when the first functions of the image forming device cannot process the print job. When the determination step determines that the second functions of the second devices cannot process the print job, the computer constrains the second functions of the second devices from being utilized.

In another aspect, there is provided a print system including a print management device and an image forming device. The print management device includes a retrieval unit that retrieves information about first functions of the image forming device and information about second functions of plural second devices, wherein the image forming device and the second devices are connected to the print system including the print management device; and a determination unit that determines whether the second functions of the second devices can process a print job, when the first functions of the image forming device cannot process the print job. When the determination unit determines that the second functions of the second devices cannot process the print job, the print management device constrains the second functions from being utilized.

Further, a method, a device, a system, a computer program, a recording medium, and a data structure, for which a portion of the embodiment or an arbitrary combination of portions of the embodiment is applied, may be effective as aspects of the embodiment.

According to the embodiment, a print management program, a print management device, a print management method, and a print system that can perform print setting, in which the entire printing processes are reflected, can be provided.

Other objects, features and advantages of the present invention will become more apparent from the following detailed description when read in conjunction with the accompanying drawings.

DETAILED DESCRIPTION OF THE PREFERRED EMBODIMENTS

Hereinafter, an embodiment of the present invention is explained by referring to accompanying figures. Here, the print system described below is to facilitate understanding of the embodiment. The embodiment is not limited to the print system described below.

Figure 1:
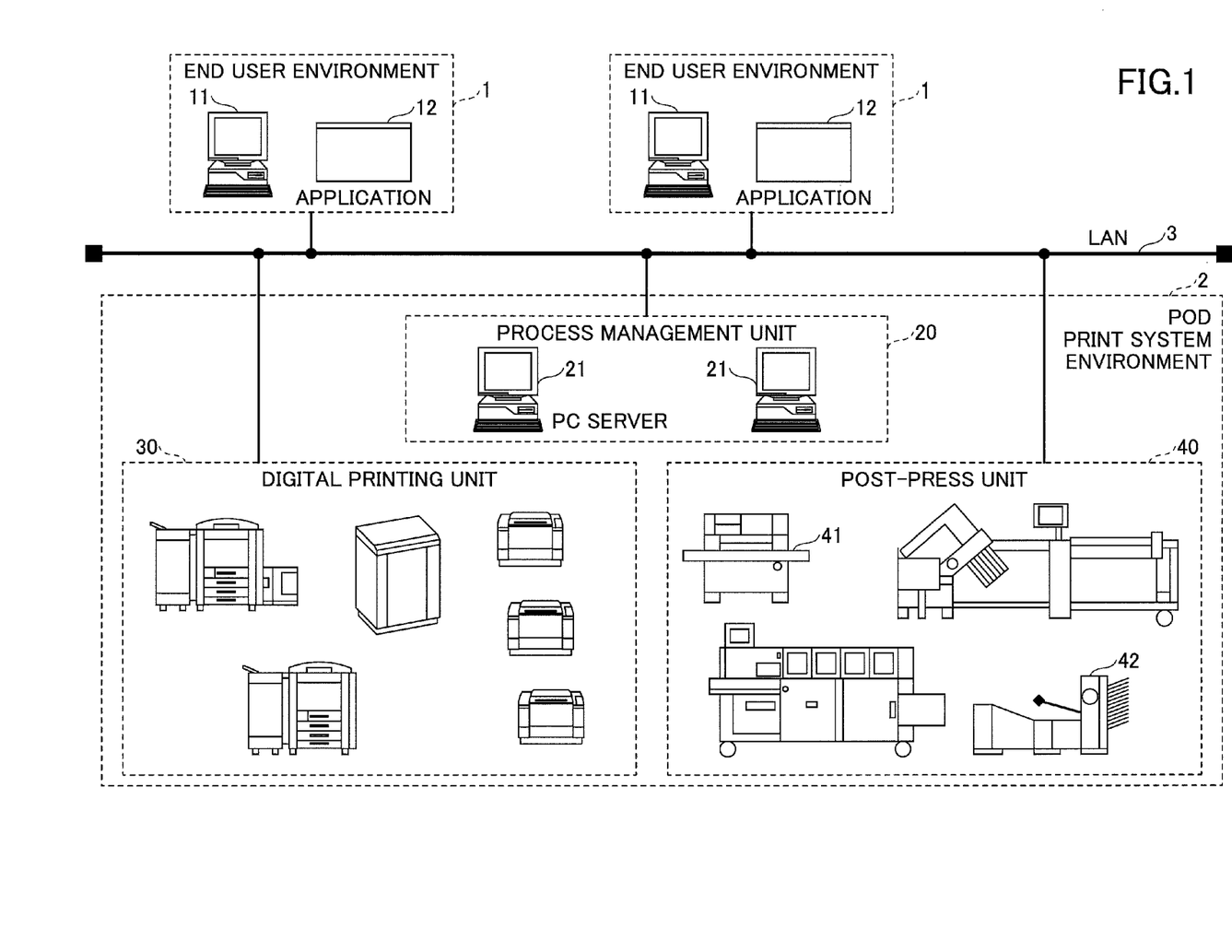
FIG. 1 is a block diagram showing an example of an overall configuration of a print system according to an embodiment.

FIG. 1 is a block diagram showing an example of an overall configuration of a print system according to the embodiment. The print system according to the embodiment includes one or more end user environments 1; and a POD print system environment 2. The end user environments 1 and the POD print system environment 2 are connected through a network 3, such as a LAN.

Each of the end user environments 1 is, for example, an environment where there is a client PC 11 connected to a corporate intranet. As an example of an application for a POD printing service, a print job generating application is installed on the client PC 11. The client PC 11 can generate a print job.

The print job generating application 12 can execute an imposition function for attaching plural logical page images to a page, or an image editing function for adding information, such as a header, a footer, or a page number. Further, the print job generating application 12 can specify an instruction for hole-punching and an instruction for stapling, for printing and bookbinding.

In the POD print system environment 2, a process management unit 20, a digital printing unit 30, and a post-press unit 40 are connected online. In the POD print system environment 2, the process management unit 20 instructs the digital printing unit 30 and the post-press unit 40 to execute works. The process management unit 20 centrally manages the workflow of the POD print system environment 2.

The process management unit 20 receives print jobs (print orders) from the end user environments 1, and stores the print jobs. Further, the process management unit 20 can construct a workflow from works to be executed by the corresponding units, based on a print job from an end user. In addition, the process management unit 20 can efficiently perform scheduling of the works to be executed by the digital printing unit 30, the post-press unit 40, and operators. Furthermore, when an error occurs during an automatic operation of the print system, the process management unit 20 may notify the operator of the occurrence of the error. In general, the process management unit 20 includes at least one PC server 21.

The digital printing unit 30 reads a paper manuscript received from an end user by using a scanner, such as a monochrome MFP or a color MFP, and outputs the results, in accordance with the instructions on the print job received from the process management unit 20. In this manner, the digital printing unit 30 performs copying. The digital printing unit 30 can print a document and/or an image file received from an end user through the client PC 11 and through one of a printer driver and a hot folder, by using a printing device, such as the monochrome MFP or the color MFP. Further, the digital printing unit 30 can print a scanned image file that is scanned by the scanner. Furthermore, the digital printing unit 30 can print a document and/or an image file created by editing the foregoing document and/or image file, and the scanned image file.

The post-press unit 40 controls post-processing devices in accordance with operating instructions on post-press job received from the process management unit 20. Here, the post-processing devices includes, at least, a paper folding device, a saddle stitching bookbinding device, a perfect binding device, a paper cutting device, a mail inserting device, and a collator. Further, the post-press unit 40 performs finishing processes to the printed paper, which has been output from the digital printing unit 30. The finishing processes includes, for example, a folding process, a saddle stitching bookbinding process, a perfect binding process, a cutting process, a mail inserting process, and a collating process. The post-press unit 40 includes post-processing devices for performing post-processes after digital printing, such as a stapler 41 and a hole punch device 42.

Figure 2:
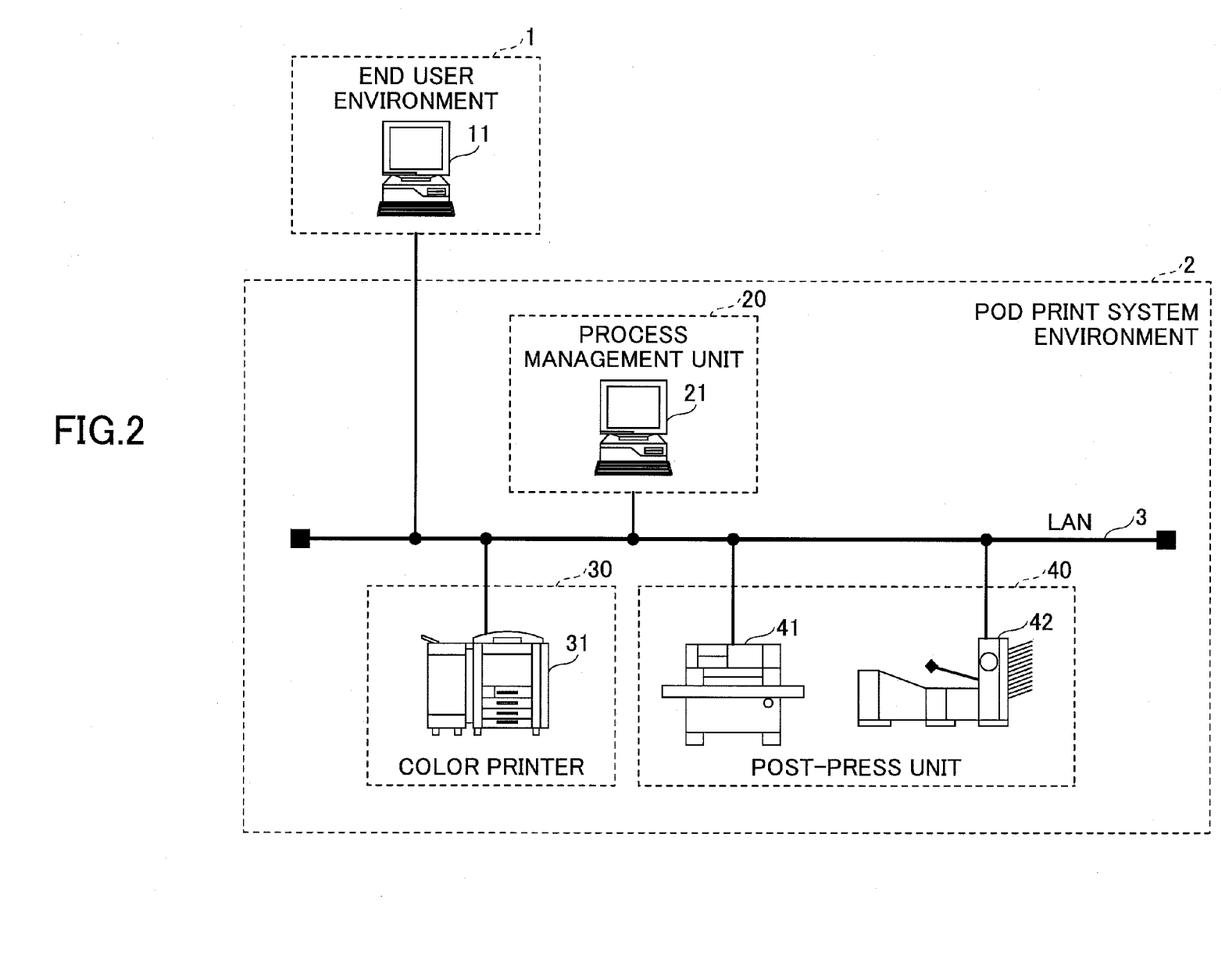
FIG. 2 is a system configuration diagram schematically showing the configuration of the print system.

FIG. 2 is a system configuration diagram schematically showing the configuration of the print system according to the embodiment. FIG. 2 shows an example where the overall configuration of the print system shown in the block diagram of FIG. 1 is more simply configured.

An end user, for example, edits an image, performs an imposition process, inserts text, and instructs an execution of the post-process, by using the application for the POD printing service from the client PC 11 in the end user environment 1. In this manner, the end user issues a print order (sends a print job) to the process management unit 20 in the POD print system environment 2. The print job includes order information, which is referred to as a job ticket, and print data.

The PC server 21 in the process management unit 20 generates a print job (a print order) in accordance with the information (print setting) included in the job ticket. Then the PC server 21 sends instructions of the print data to the digital printing unit 30 and the post-press unit 40.

The established configuration of the digital printing unit 30 varies depending on the POD print system environment 2. However, in many cases, the digital printing unit 30 includes a combination of color or monochrome printers that can handle high-speed printing and that can print high-quality images. Recent printers can perform not only printing functions online, but also can perform post-processing of the printing, at once, online. Here, the post-processing includes at least hole-punching, cutting, perfect binding, and ring binding.

In the configuration example of FIG. 2, a color printer 31 of the digital printing unit 30 includes a stapling function and a hole-punching function. Further, the post-press unit 40 includes the stand-alone stapler 41 having a stapling function, and the stand-alone hole-punch device 42 having a hole-punching function.

Figure 3:
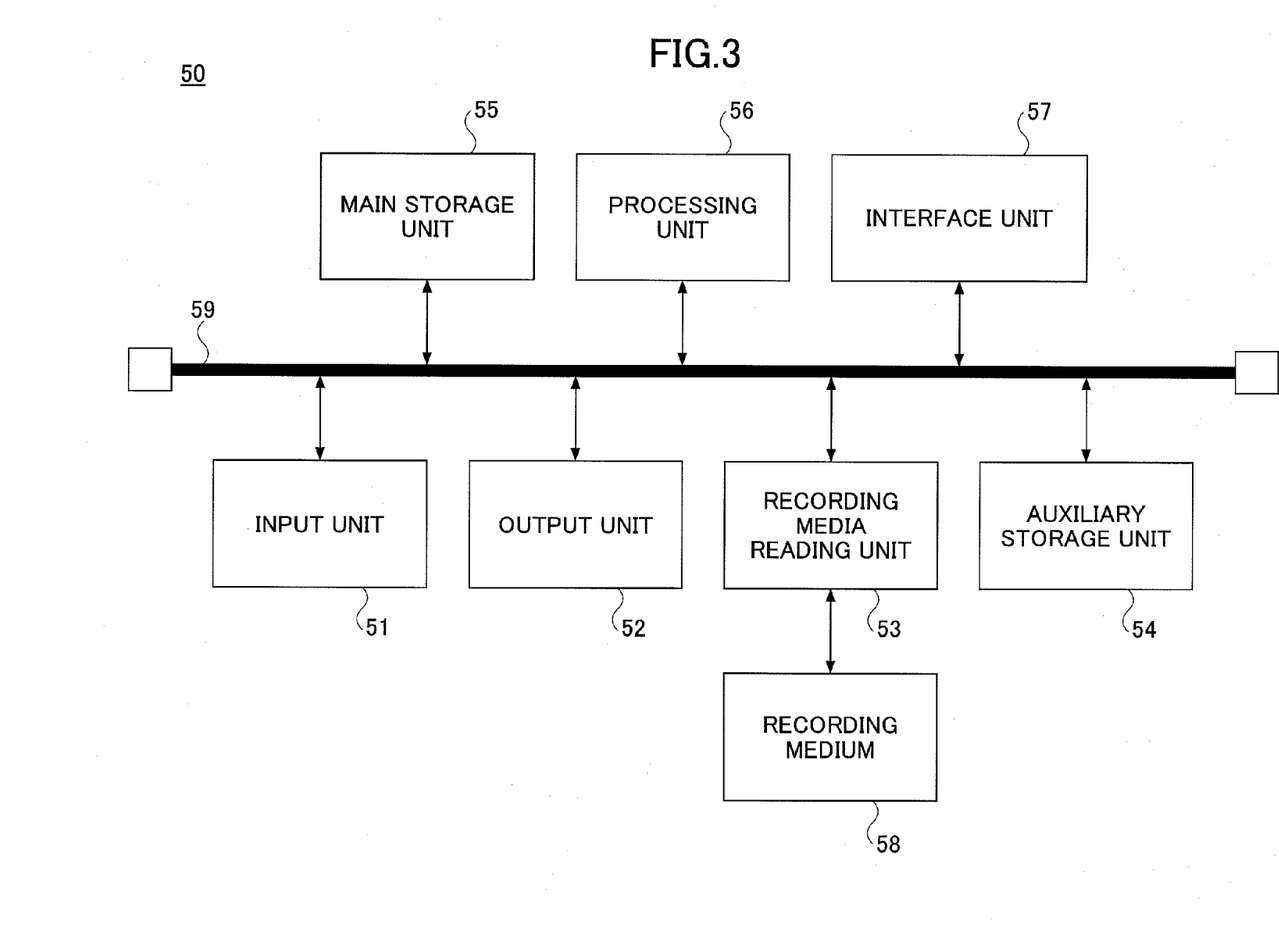
FIG. 3 is a hardware configuration diagram of an example of a PC.

The client PC 11 in the end user environment 1 can be realized, for example, by a PC 50 having a hardware configuration shown in FIG. 3. FIG. 3 is a hardware configuration diagram of an example of the PC 50. The PC 50 shown in FIG. 3 includes an input unit 51, an output unit 52, a recording media reading unit 53, an auxiliary storage unit 54, a main storage unit 55, a processing unit 56, and an interface 57, which are mutually connected through a bus 59.

The input unit 51 is, for example, a keyboard and a mouse. The input unit 51 is used for inputting various signals. The output unit 52 is, for example, a display device. The output unit 52 is used for displaying various windows and data. The interface unit 57 is, for example, a modem or a LAN card. The interface unit 57 is used for connecting the PC 50 to the network 3.

The print job generating application installed on the client PC 11 is, at least, a part of various programs that control the PC 50. The print job generating application may be distributed as a recording medium 58, or downloaded from the network 3.

As the recording medium 58, various types of recording mediums may be utilized. For example, as the recording medium 58, a recording medium, such as a CD-ROM, a flexible disk, or a magnetic optical disk, may be utilized. In such a recording medium, information is optically, electrically, or magnetically recorded. Further, as the recording medium 58, a semiconductor memory, such as a ROM, or a flash memory, may be utilized. In such a semiconductor memory, information is electrically recorded.

When the recording medium 58, in which the print job generating application is recorded, is set up in the recording media reading unit 53, the print job generating application is installed onto the auxiliary storage unit 54 from the recording medium 58 through the recording media reading unit 53. The print job generating application that is downloaded from the network 3 or the like is installed onto the auxiliary storage unit 54 through the interface 57. The auxiliary storage unit 54 stores the installed print job generating application, necessary files, and data.

When the print job generating application is executed, the main storage unit 55 retrieves the print job generating application from the auxiliary storage unit 54 and stores the print job generating application therein. Then the processing unit 56 executes various processes (described later) in accordance with the print job generating application stored in the main storage unit 55.

Similarly, the PC server 21 in the process management unit 20 is realized, for example, by a PC shown in FIG. 3. A processing unit 56 of the PC server 21 realizes various processes of the process management, in accordance with a process management program stored a main storage unit 55 of the PC server 21.

Figure 4:
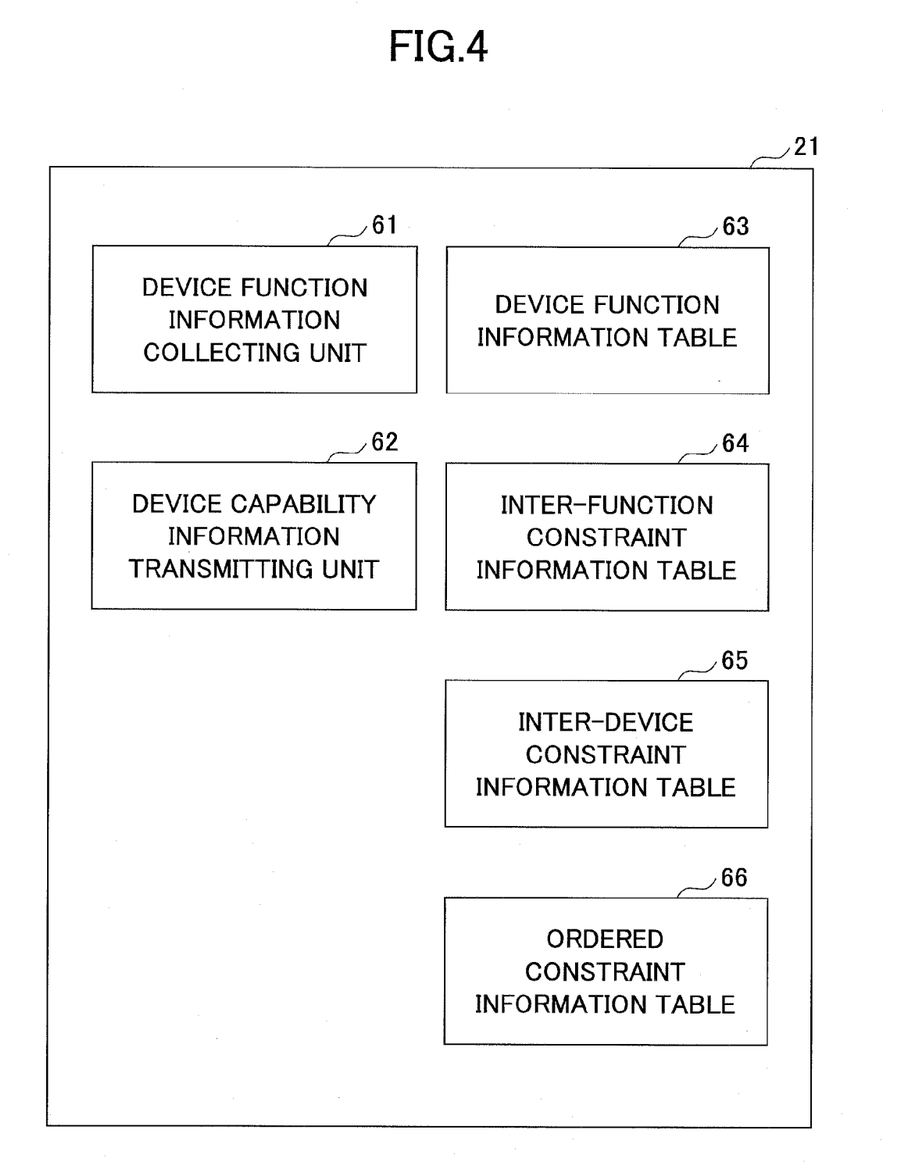
FIG. 4 is a processing block diagram of an example of a PC server.

The PC server 21 in the process management unit 20 is realized, for example, by processing blocks shown in FIG. 4. FIG. 4 is a processing block diagram of an example of the PC server 21. A process management program is installed on the PC server 21. The PC server 21 realizes a device function information collecting unit 61, a device capability information transmitting unit 62, a device function information table 63, an inter-function constraint information table 64, an inter-device constraint information table 65, and an ordered constraint information table 66, by executing the process management program.

The device function information collecting unit 61 collects device function information from the devices included in the digital printing unit 30, such as the color printers 31, and from the devices included in the post-press unit 40, such as the stapler 41 and the hole-punch device 42. The device function information collecting unit 61 retrieves device function information from management information base (MIB) information of the devices by using, for example, the simple network management protocol (SNMP) of TCP/IP. The device function information collecting unit 61 stores the collected device function information in the device function information table 63.

The device capability information transmitting unit 62 transmits the device function information stored in the device function information table 63, inter-function constraint information stored in the inter-function constraint information table 64, inter-device constraint information stored in the inter-device constraint information table 65, and ordered constraint information stored in the ordered constraint information table 66 to the client PC 11 as device capability information.

The device function information table 63 stores the device function information collected from the devices. The inter-function constraint information table 64 stores the inter-function constraint information, which has been set by an operator or the like. The inter-device constraint information table 65 stores the constraint information among the devices, which has been set by the operator or the like. The ordered constraint information table 66 stores the ordered constraint information, which has been set by the operator or the like.

Figure 5:
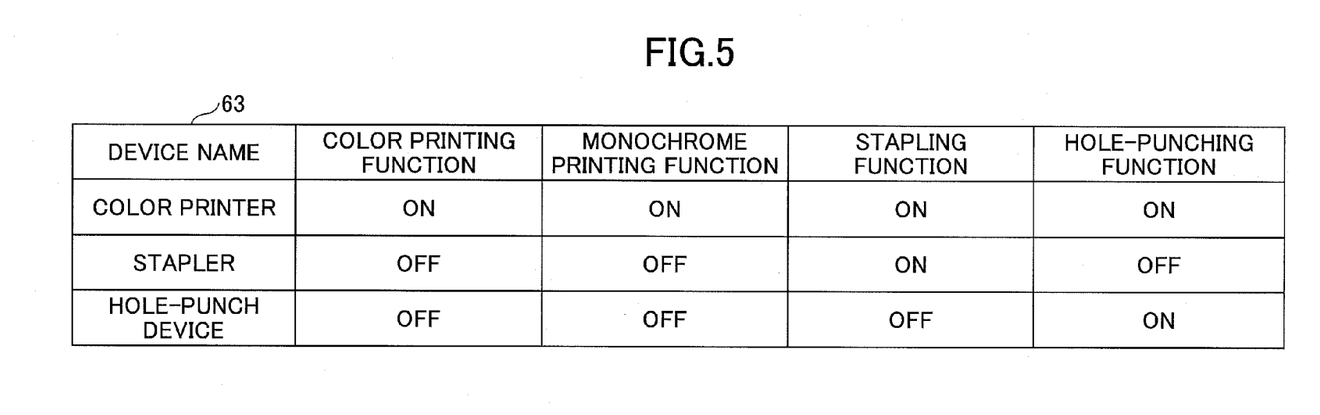
FIG. 5 is a configuration diagram of an example of a device function information table.

FIG. 5 is a configuration diagram of an example of the device function information table 63. The device function information table 63 indicates, for each of the device names shown in FIG. 5, availability or unavailability of a color printing function, a monochrome printing function, a stapling function, and a hole-punching function, by ON or OFF.

However, for an actual device, not only the ON/OFF information of the stapling function, but also various information, such as information about staplable positions, an angle of stapling, the number of simultaneously staplable staples, and a shape of the staples, may be defined as the function information. Further, for the actual device, not only the ON/OFF information of the hole-punching function, but also various information, such as information about the number of the holes, and hole-punched positions, may be defined as the function information. Here, for the sake of simplicity, only the ON/OFF information of the stapling function and the hole-punching function is indicated.

The device function information table 63 shown in FIG. 5 indicates, for example, that, for the color printer 31 in the digital printing unit 30, the color printing function, the monochrome printing function, the stapling function, and the hole-punching function are available (ON). Further, the device function information table 63 shown in FIG. 5 indicates that, for the stapler 41 in the post-press unit 40, only the staple function is available (ON). Further, the device function information table 63 shown in FIG. 5 indicates that, for the hole-punch device 42 in the post-press unit 40, only the hole-punching function is available (ON).

Figure 6:
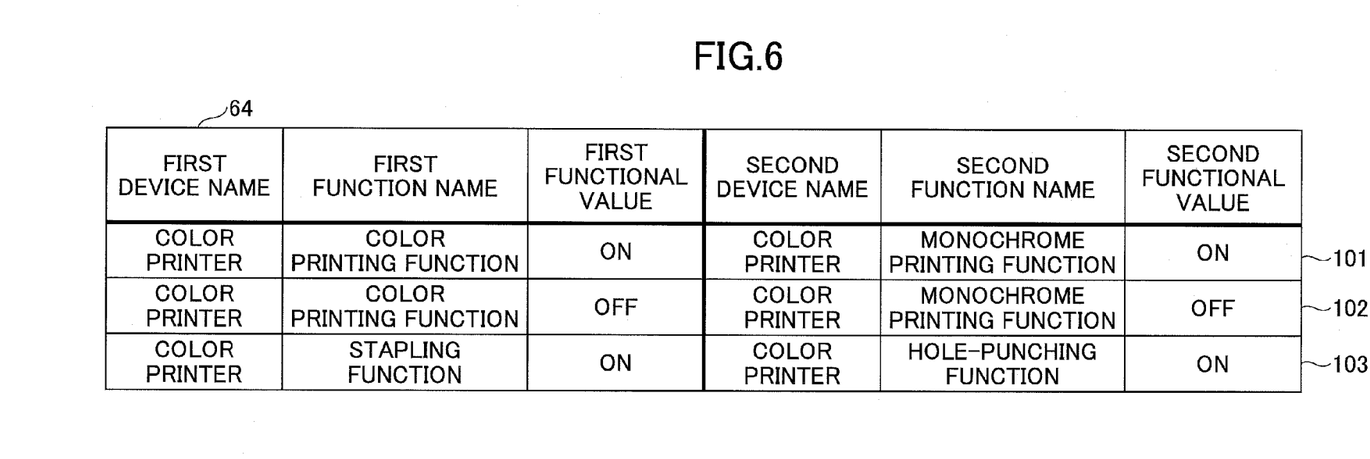
FIG. 6 is a configuration diagram of an example of an inter-function constraint information table.

FIG. 6 is a configuration diagram of an example of the inter-function constraint information table 64. The inter-function constraint information table 64 indicates, as the constraint information, that, when the device function information satisfies a combinatorial condition for a function of one of the devices, the selection of the function is constrained. Here, the device function information has been obtained from the devices in the system configuration example of FIG. 2.

The inter-function constraint information table 64 indicates pairs of a first combination and a second combination. Here, the first combination includes a first device name, a first function name, and a first functional value. The second combination includes a second device name, a second function name, and a second functional value. The inter-function constraint information table 64 indicates that the first combination and the second combination included in each of the above described pairs are constrained from simultaneously occurring within the same system.

The inter-function constraint information 101 indicates that, since the color printing function and the monochrome printing function of the color printer 31 are mutually exclusive functions, they are constrained from simultaneously being turned on. With the inter-function constraint information 101, for the color printer 31, only one of the color printing function and the monochrome printing function can be selected at once.

The inter-function constraint information 102 indicates that, since the color printing function and the monochrome printing function of the color printer 31 are mutually exclusive functions, they are constrained from simultaneously being turned off. With the inter-function constraint information 102, for the color printer 31, only one of either the color printing function or the monochrome printing function is selected at once.

The inter-function constraint information 103 constrains the stapling function and the hole-punching function of the color printer 31 from being simultaneously turned on. Here, for some devices, the stapling function and the hole-punching function may be simultaneously performed. However, FIG. 6 shows the example, where the simultaneous selection of the stapling function and the hole-punching function is constrained.

Figure 7:
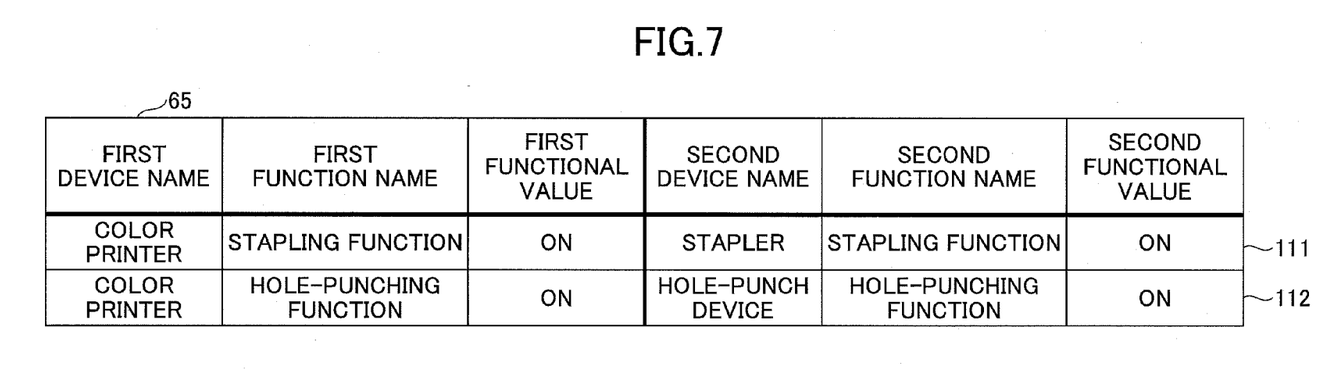
FIG. 7 is a configuration diagram of an example of an inter-device constraint information table.

FIG. 7 is a configuration diagram of an example of the inter-device constraint information table 65. The inter-device constraint information table 65 of FIG. 7 indicates, as the constraint information, that, when the device function information obtained from the devices in the system configuration example of FIG. 2 satisfies a combinatorial condition between devices, the functions specified by the combinatorial condition are constrained from being simultaneously selected.

The inter-device constraint information table 65 indicates pairs of a first combination and a second combination. Here, the first combination includes a first device name, a first function name, and a first functional value. The second combination includes a second device name, a second function name, and a second functional value. The inter-device constraint information table 65 indicates that the first combination and the second combination included in each of the above described pairs are constrained from simultaneously occurring in the corresponding first device and the second device.

The inter-device constraint information 111 constrains the stapling function of the color printer 31 and the stapling function of the stapler 41 from being simultaneously turned on. In other words, the inter-device constraint information 111 indicates that once the printed output material is stapled by the color printer 31, the stapler 41 is not allowed to staple the printed output material.

The inter-device constraint information 112 constrains the hole-punching function of the color printer 31 and the hole-punching function of the hole-punch device 42 from simultaneously being turned on. In other words, the inter-device constraint information 112 indicates that once the printed output material is hole-punched by the color printer 31, the hole-punch device 42 is not allowed to hole-punch the printed output material.

In this manner, the inter-device constraint information table 65 constrains the specific combinations of the functions between the devices from simultaneously being selected. In other words, the inter-device constraint information table 65 specifies constraining rules applied to a combination of the devices.

Figure 8:
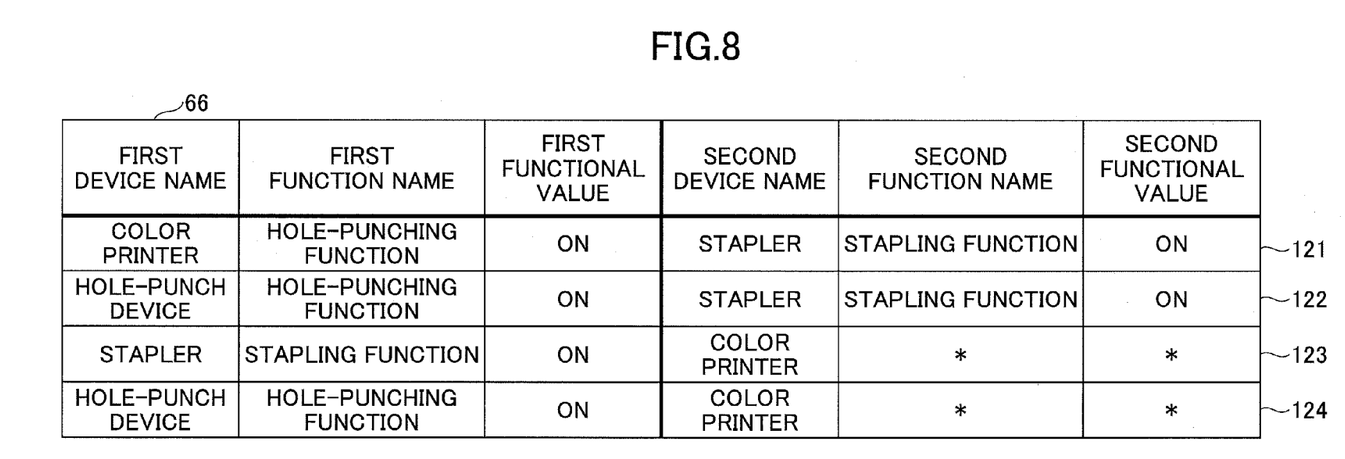
FIG. 8 is a configuration diagram of an example of an ordered constraint information table.

FIG. 8 is a configuration diagram of an example of the ordered constraint information table 66. The ordered constraint information table 66 indicates constraint information about an execution order of functions, where the functions are performed by the different devices. Here, the information about the functions is indicated by the device function information obtained from the devices in the configuration example of FIG. 2. For example, in the system configuration example of FIG. 2, after the stapler 41 of the post-press unit 40 completes stapling, the color printer 31 of the digital printing unit 30 is constrained from printing. The ordered constraint information table 66 indicates the constrained execution orders of the functions, where the functions are performed by the different devices.

The ordered constraint information table 66 shows that after a first function specified by a first combination of a first device name, a first function name, and a first functional value is being performed, a second function specified by a second combination of a second device name, a second function name, and a second functional value is constrained from being performed.

The inter-function constraint information table 64 and the inter-device constraint information table 65 define constraining rules that constrain the specific combinations of the device functions from simultaneously being performed. Namely, the inter-function constraint information table 64 and the inter-device constraint information table 65 define constraining rules that do not depend on the execution orders of the device functions. On the other hand, the ordered constraint information table 66 defines the constraining rules that depend on the execution orders of the device functions. Namely, the ordered constraint information table 66 indicates that after completing an execution of a specific function of a device, an execution of another specific function of another device is constrained. In other words, each of the combinations of the device functions indicated in the ordered constraint information table 66 can be executed, provided that the execution order of the device functions in the combination are reversed. Further, the inter-function constraint information table 64 defines the constraining rules on the device functions of a single device. On the other hand, the ordered constraint information table 66 defines the constraining rules on the combinations of the first functions and the second functions, where the first function and the second function in each of the combinations are performed by different devices.

The ordered constraint information 121 indicates that, after completing the execution of the hole-punching function of the color printer 31, the stapling function of the stapler 41 is constrained from being executed. The ordered constraint information 122 indicates that, after completing the execution of the hole-punching function of the hole-punch device 42, the stapling function of the stapler 41 is constrained from being executed. The ordered constraint information 123 indicates that, after completing the execution of the staple function of the stapler 41, all the functions of the color printer 31 are constrained from being executed. Here, "*" in the ordered constraint information table 66 represents all functions. The ordered constraint information 124 indicates that, after completing the execution of the hole-punching function of the hole-punch device 42, all the functions of the color printer 31 are constrained from being executed.

The PC server 21 in the process management unit 20 includes the device function information table 63, the inter-function constraint information table 64, the inter-device constraint information table 65, and the ordered constraint information table 66. Here, the device function information table 63 defines the functions of the devices included in the digital printing unit 30 or the post-press unit 40. The inter-function constraint information table 64 defines combinations of functions within a single device, where the functions included in each of the combinations are constrained from being simultaneously selected. The inter-device constraint information table 65 defines combinations of functions, where the functions included in each of the combinations are executed by different devices and are constrained from being simultaneously specified. The ordered constraint information table 66 defines constraint information that depends on execution orders of combinations of functions, where the functions included in each of the combinations are executed by different devices.

The constraint information stored in the inter-function constraint information table 64, the inter-device constraint information table 65, the ordered constraint information table 66 may be retrieved from the devices in the digital printing unit 30 or the post-press unit 40 by a communication function that utilizes, for example, the SNMP and the MIB. Alternatively, the above described constraint information may be registered in the PC server 21 in the process management unit 20 in advance.

The device capability information transmitting unit 62 transmits the device function information stored in the device function information table 63, the inter-function constraint information stored in the inter-function constraint information table 64, the inter-device constraint information stored in the inter-device constraint information table 65, and the ordered constraint information stored in the ordered constraint information table 66 to the print job generating application 12 installed on the client PC 11 in the end user environment 1 through the network 3.

The print job generating application 12 performs the screen control based on the device function information table 63, the inter-function constraint information table 64, the inter-device constraint information table 65, and the ordered constraint information table 66, so that available functions and unavailable functions are displayed on the screen.

Figure 9:
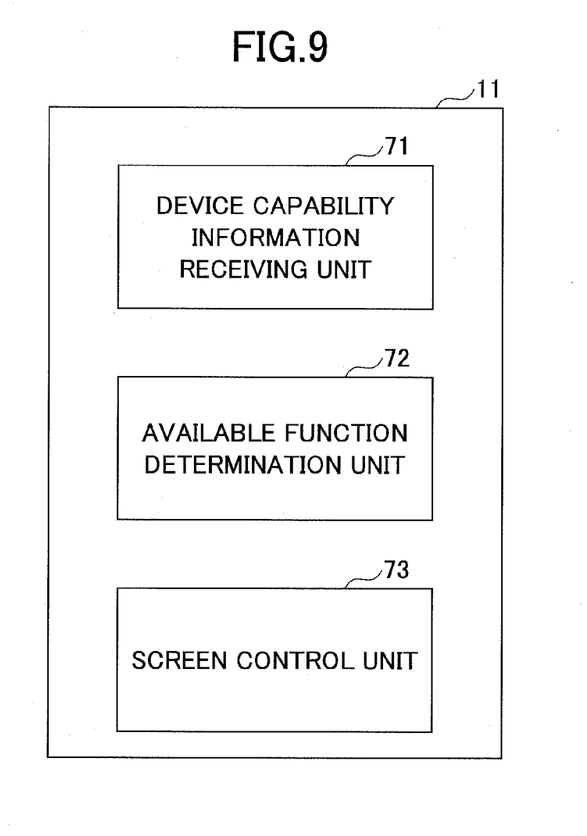
FIG. 9 is a processing block diagram of an example of a client PC.

The client PC 11 in the end user environment 1 is realized by, for example, processing blocks shown in FIG. 9. FIG. 9 is a processing block diagram of an example of the client PC 11. The print job generating application 12 has been installed on the client PC 11. The client PC 11 realizes a device capability information receiving unit 71, an available function determination unit 72, and a screen control unit 73 by executing the print job generating application 12.

The device capability information receiving unit 71 receives the device function information stored in the device function information table 63, the inter-function constraint information stored in the inter-function constraint information table 64, the inter-device constraint information stored in the inter-device constraint information table 65, and the ordered constraint information stored in the ordered constraint information table 66 from the PC server 21 as the device capability information.

The available function determination unit 72 determines whether functions are available or unavailable based on the received device capability information, as described later. The screen control unit 73 performs the screen control of a job ticket setting screen based on the availability or the unavailability of the functions, as described later.

Figure 10:
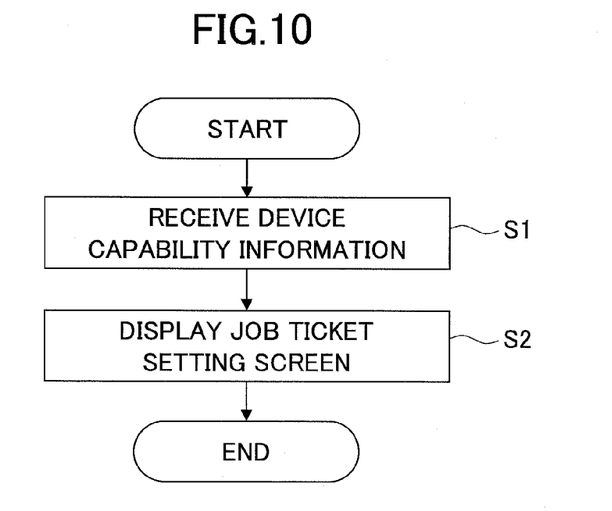
FIG. 10 is a flowchart showing an example of a displaying procedure of a job ticket setting screen.

FIG. 10 is a flowchart showing an example of a procedure of displaying the job ticket setting screen. At step S1, the device capability information receiving unit 71 receives the device capability information from the PC server 21. In general, the device capability information is text in the XML format, and the device capability information is retrieved by transferring the file using a protocol, such as HTTP. However, the data format and the protocol are not limited to that of the example.

At step S2, the available function determination unit 72 determines whether functions are available or unavailable based on the received device capability information, as described later. The screen control unit 73 performs the screen control of the job ticket setting screen based on the availability or the unavailability of each of the functions, so that the functions which have been determined to be available is selectable on the screen, as described later.

Figure 11:
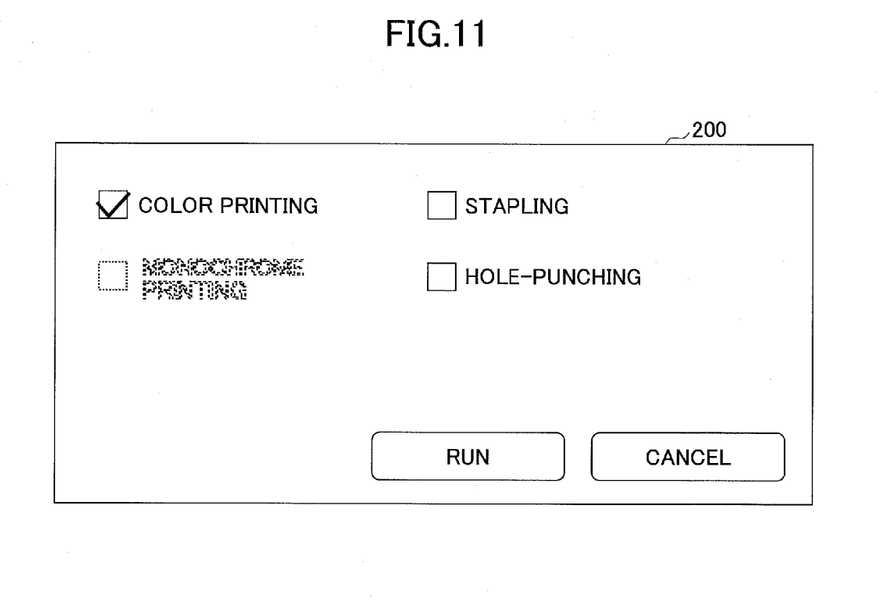
FIG. 11 is an image diagram of an example of the job ticket setting screen.

FIG. 11 is an image diagram of an example of the job ticket setting screen. When each of the functions takes two values as shown in the device function information table 63 in FIG. 5, the job ticket setting screen 200 in FIG. 11 may be a checkbox, or another function selection screen. For example, when each of the functions takes more than two values, the job ticket setting screen 200 may be a function selection screen, such as a combo box.

Further, when a particular function is set to be selectable on the job ticket setting screen 200, the screen control unit 73 may cause an item for selecting the particular function to be displayed on the job ticket setting screen 200. When the particular function is not set to be selectable on the job ticket setting screen 200, the screen control unit 73 may cause the item for selecting the particular function not to be displayed on the job ticket setting screen 200. Alternatively, when the particular function is not set to be selectable, the screen control unit 73 may cause the item for selecting the particular function to be displayed with "greyed out." The available function determination unit 72 determines the availability or unavailability of the functions, not based on the individual device function information, but based on the information about the whole print system.

In FIG. 11, since the stapling function and the hole-punching function are determined to be available in the whole print system based on the device function information stored in the device function information table 63 of FIG. 5, the job ticket setting screen 200 selectably displays the items for selecting the stapling function and the hole-punching function. Incidentally, on the job ticket setting screen 200 of FIG. 11, the color printing function has already been checked. Thus the available function determination unit 72 determines that the monochrome printing function is unavailable, based on the inter-function constraint information stored in the inter-function constraint information table 64 of FIG. 6. Therefore, the monochrome printing function is displayed with "greyed out."

Figure 12:
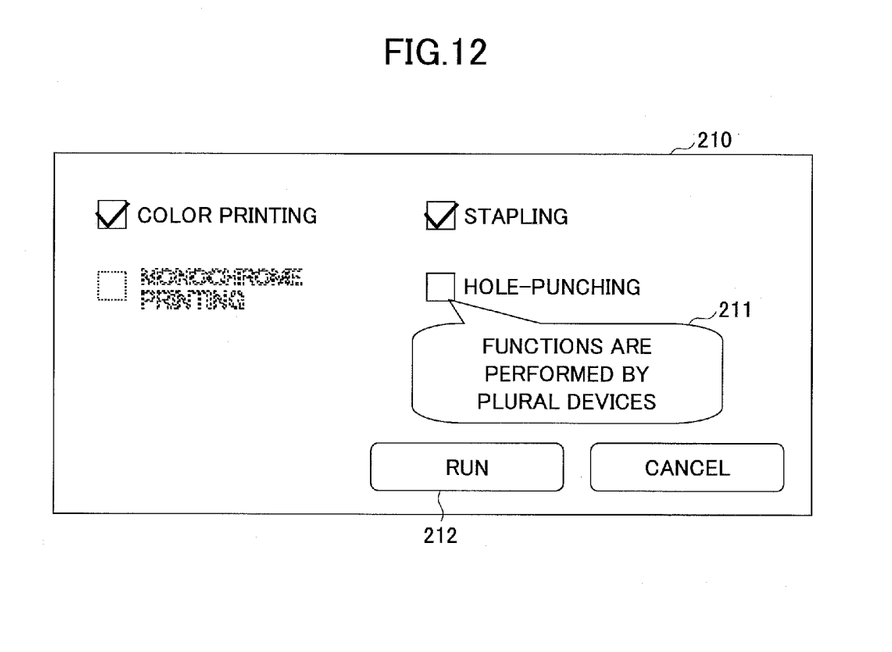
FIG. 12 is an image diagram of an example of the job ticket setting screen, in which a stapling function is checked.

FIG. 12 is an image diagram of an example of a job ticket setting screen 210, where the stapling function has been checked. The job ticket setting screen 210 of FIG. 12 is an example of a warning display for warning that the functions are performed by plural devices. Here, a method, a form, and a format of the display are not limited to that of the job ticket setting screen 210 shown in FIG. 12. The warning display may be indicated by a balloon 211 as shown in FIG. 12. Alternatively, the warning display may be indicated by a color, an icon, or another display method. The available function determination unit 72 may notice, in advance, that the functions are performed by the plural devices, based on the inter-function constraint information stored in the inter-function constraint information table 64 of FIG. 6. Further, the warning display for warning that the functions are performed by the plural devices may be indicated at a time that the staple function is checked. Alternatively, the warning display may be indicated at a time that is immediately prior to the hole-punching function being checked (at a time that the mouse cursor overlaps with the checkbox), or at a time that the hole-punching function is checked.

When the hole-punching function is checked and the run button 212 is pressed on the job ticket setting screen 210 of FIG. 12, a print job generating unit (not shown) realized by the print job generating application 12 generates a job ticket corresponding to the color printing function, the stapling function and the hole-punching function, and instructs an execution of print processing to the POD print system environment 2 (a portion of the print system).

The process management unit 20 in the POD print system environment 2 may determine as to which devices actually perform the stapling function and the hole-punching function. Further, the process management unit 20 may determine an execution order for performing the stapling function and the hole-punching function. Further, the execution order for performing the stapling function and the hole-punching function may be defined in the job ticket.

Figure 13:
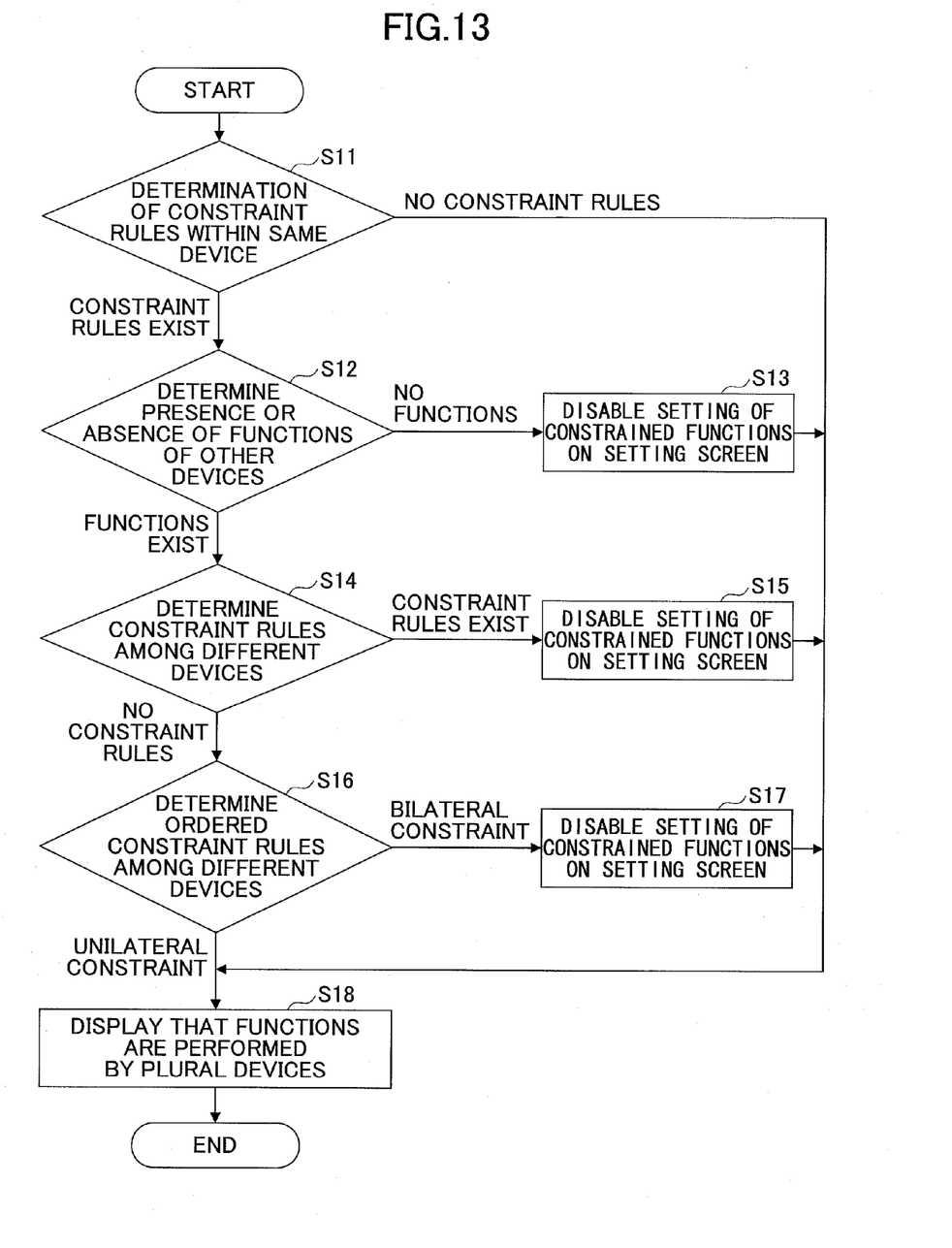
FIG. 13 is a flowchart showing an example of a procedure, when a function in the job ticket setting screen is checked.

FIG. 13 is a flowchart showing an example of a procedure when a function on the job ticket setting screen 200 is checked. When an operator operating the client PC 11 checks the stapling function on the job ticket setting screen 200, the available function determination unit 72 determines, at step S11, functions within the same device, which are constrained from being simultaneously performed with the stapling function, based on the inter-function constraint information stored in the inter-function constraint information table 64 of FIG. 6. At step S11, the functions within the same device, which are constrained from being simultaneously performed with the stapling function, are determined.

This is because, in general, it is more efficient to perform all the processes within the same device. Here, if it is more efficient to distribute the processes over different devices, the constraining rules among the different devices may be determined earlier. In the embodiment, based on the inter-function constraint information 103, it can be understood that the stapling function and the hole-punching function are constrained from being simultaneously selected.

Since the available function determination unit 72 can obtain the inter-device constraint information, when the available function determination unit 72 determines, at step S11, that there are some functions which are constrained from being performed, the available function determination unit 72 determines, at step S12, whether the constrained functions can be performed by another device. In the embodiment, it can be understood from the device function information table 63 of FIG. 5 that the hole-punching function can be performed by the hole-punch device 42.

Further, when the available function determination unit 72 determines, at step S12, that the constrained functions are also constrained from being performed by another device, the available function determination unit 72 performs the process of step S13. At step S13, the available function determination unit 72 disables the setting of the constrained functions on the job ticket setting screen 200.

When the available function determination unit 72 determines, at step S12, that the constrained functions can be performed by another device, namely, the constrained functions can be performed by plural devices, the available function determination unit 72 determines, at step S14, constraining rules among the devices, based on the inter-device constraint information table 65.

Here, when the constrained functions are also constrained from being performed by the plural devices, the available function determination unit 72 determines that the functions are unavailable, and performs the process of step S15. At step S15, the available function determination unit 72 disables the setting of the constrained functions on the job ticket setting screen 200. In the embodiment, it can be understood from the inter-device constraint information table 65 of FIG. 7 that the combination of the stapling function of the color printer 31 and the hole-punching function of the hole-punch device 42 is not constrained.

Further, when the functions are not constrained from being performed by the plural devices, the available function determination unit 72 determines, at step S16, ordered constraining rules among different devices based on the ordered constraint information table 66 of FIG. 8. When the functions are constrained from being performed irrespectively of the execution order, the available function determination unit 72 performs the process of step S17. At step S17, the available function determination unit 72 disables the setting of the constrained functions on the job ticket setting screen 200.

On the other hand, when the functions are not constrained with respect to a particular execution order, the available function determination unit 72 enables the setting of the functions, and indicates the warning display for warning that the functions are performed by the plural devices at step S18.

It can be understood from the ordered constraint information 121 of the ordered constraint information table 66 in FIG. 8 that an execution order of performing the hole-punching function of the color printer 31 and subsequently performing the stapling function of the stapler 41 is constrained. Further, it can be understood from the ordered constraint information table 66 in FIG. 8 that an execution order of performing the stapling function of the color printer 31 and subsequently performing the hole-punching function of the hole-punch device 42 is not constrained.

According to the embodiment, the print setting can be assigned to the job ticket, while taking into consideration of the functions and the constraining rules of the color printer 31 and the functions of the constraining rules of the whole printing processes. Further, when the functions are performed by the plural devices, a delivery delay and a cost increase may occur because of the increase in the amount of the work.

Therefore, in such a case, according to the embodiment, the print system may warn an operator that the functions will be performed by the plural devices. Since the operator may distinguish functions that can be performed by a single device from functions that can be performed in the whole printing processes, the operator can assign a desired print setting to a job ticket while taking into consideration whether the functions are performed by the plural devices.

The present invention is not limited to the specifically disclosed embodiments, and variations and modifications may be made without departing from the scope of the present invention.

The present application is based on Japanese Priority Application No. 2011-045641 filed on Mar. 2, 2011, the entire contents of which are hereby incorporated herein by reference.

What is claimed is:

1. A non-transitory computer readable recording medium that stores a print management program causing a computer to function as:

a retrieval unit that retrieves information about first functions of an image forming device and information about second functions of plural second devices, wherein the image forming device and plural of the second devices are connected to a print system including the computer; and a determination unit that determines whether the second functions of the second devices can process a print job, when the first functions of the image forming device cannot process the print job, wherein, when the determination unit determines that the second functions of the second devices cannot process the print job, the print management program constrains the second functions of the second devices from being utilized, wherein the information about the first functions of the image forming device includes first information about the first functions that can be executed solely by the image forming device and first constraint information about first combinations of the first functions, each of the first combinations of the first functions being constrained from being executed, wherein the information about the second functions of the second devices included in the print system includes second information about second functions that can be executed by the second devices included in the print system, second constraint information about second combinations of the second functions, and ordered constraint information about execution orders of executing corresponding third combinations of the second functions, wherein each of the second combinations of the second functions is constrained from being executed, and wherein each of the third combinations of the second functions is constrained from being executed in accordance with the corresponding execution order.

2. The non-transitory computer readable recording medium according to claim 1, wherein the print management program further causing the computer to function as:

a display unit that distinguishably displays the first functions of the image forming device and the second functions of the second devices; and a user interface unit which can accept print setting set by an operator, based on a content displayed by the display unit.

3. The non-transitory computer readable recording medium according to claim 1, wherein, when the first functions of the image forming device cannot process the print job but the determination unit determines that the second functions of the second devices can process the print job, the print management program generates the print job, while assuming that the print job can be processed by the first functions.

4. The non-transitory computer readable recording medium according to claim 1,
wherein, when the first functions of the image forming device cannot process the print job but the determination unit determines that the second functions of the second devices can process the print job, the print management program generates the print job, while assuming that the print job can be processed by a combination of the first functions and the second functions.

5. A print management device comprising:
a retrieval unit configured to retrieve information about first functions of an image forming device and information about second functions of plural second devices, wherein the image forming device and the second devices are connected to a print system including the print management device; and
a determination unit configured to determine whether the second functions of the second devices can process a print job, when the first functions of the image forming device cannot process the print job,
wherein, when the determination unit determines that the second functions of the second devices cannot process the print job, the print management device constrains the second functions from being utilized,
wherein the information about the first functions of the image forming device includes first information about the first functions that can be executed solely by the image forming device and first constraint information about first combinations of the first functions, each of the first combinations of the first functions being constrained from being executed,
wherein the information about the second functions of the second devices included in the print system includes second information about second functions that can be executed by the second devices included in the print system, second constraint information about second combinations of the second functions, and ordered constraint information about execution orders of executing corresponding third combinations of the second functions,
wherein each of the second combinations of the second functions is constrained from being executed, and
wherein each of the third combinations of the second functions is constrained from being executed in accordance with the corresponding execution order.

6. A print management method executed by a computer, the method comprising:
a retrieval step of retrieving information about first functions of an image forming device and information about second functions of plural second devices, wherein the image forming device and plural of the second devices are connected to a print system including the computer; and
a determination step of determining whether the second functions of the second devices can process a print job, when the first functions of the image forming device cannot process the print job,
wherein, when the determination step determines that the second functions of the second devices cannot process the print job, the computer constrains the second functions of the second devices from being utilized,
wherein the information about the first functions of the image forming device includes first information about the first functions that can be executed solely by the image forming device and first constraint information about first combinations of the first functions, each of the first combinations of the first functions being constrained from being executed,
wherein the information about the second functions of the second devices included in the print system includes second information about second functions that can be executed by the second devices included in the print system, second constraint information about second combinations of the second functions, and ordered constraint information about execution orders of executing corresponding third combinations of the second functions,
wherein each of the second combinations of the second functions is constrained from being executed, and
wherein each of the third combinations of the second functions is constrained from being executed in accordance with the corresponding execution order.

7. A print system comprising a print management device and an image forming device,
wherein the print management device including:
a retrieval unit configured to retrieve information about first functions of the image forming device and information about second functions of plural second devices, wherein the image forming device and the second devices are connected to the print system including the print management device; and
a determination unit configured to determine whether the second functions of the second devices can process a print job, when the first functions of the image forming device cannot process the print job,
wherein, when the determination unit determines that the second functions of the second devices cannot process the print job, the print management device constrains the second functions from being utilized,
wherein the information about the first functions of the image forming device includes first information about the first functions that can be executed solely by the image forming device and first constraint information about first combinations of the first functions, each of the first combinations of the first functions being constrained from being executed,
wherein the information about the second functions of the second devices included in the print system includes second information about second functions that can be executed by the second devices included in the print system, second constraint information about second combinations of the second functions, and ordered constraint information about execution orders of executing corresponding third combinations of the second functions,
wherein each of the second combinations of the second functions is constrained from being executed, and
wherein each of the third combinations of the second functions is constrained from being executed in accordance with the corresponding execution order.

8. The print system according to claim 7, wherein the print management device is connected to the image forming device and the second devices.

* * * * *